Dec. 5, 1950      L. A. WARNER      2,532,974
NAVIGATION SYSTEM
Filed Oct. 31, 1944      2 Sheets—Sheet 1
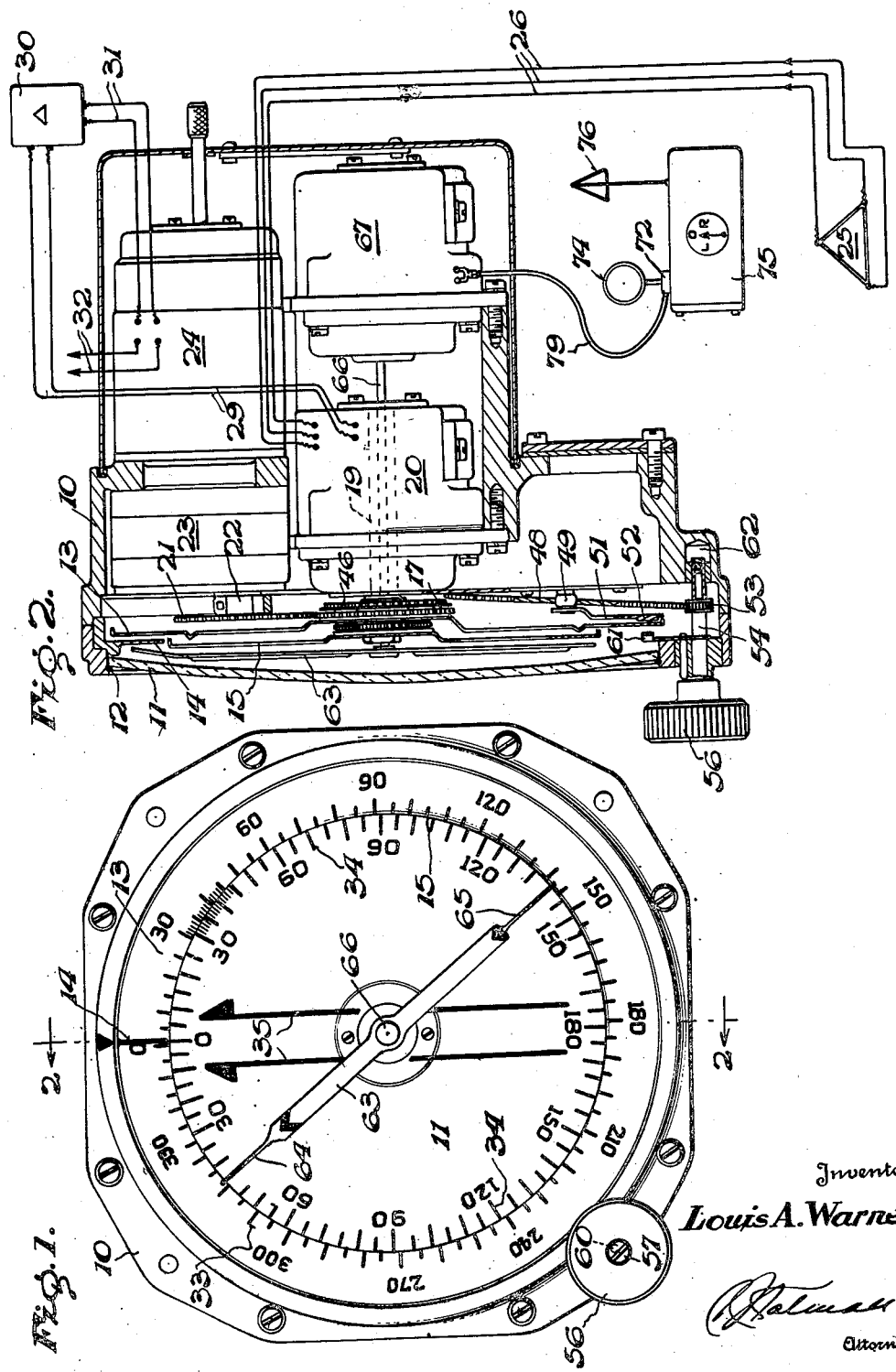
Inventor
Louis A. Warner
Attorney Dec. 5, 1950     L. A. WARNER     2,532,974
NAVIGATION SYSTEM Filed Oct. 31, 1944     2 Sheets-Sheet 2

Inventor
Louis A. Warner.
By
Attorney

Patented Dec. 5, 1950

2,532,974

UNITED STATES PATENT OFFICE 2,532,974

NAVIGATION SYSTEM

Louis A. Warner, New York, N. Y., assignor to Bendix Aviation Corporation, Teterboro, N. J., a corporation of Delaware Application October 31, 1944, Serial No. 561,210

4 Claims. (Cl. 116—129)

This invention relates to navigation indicating systems or instruments generally and more particularly to composite magnetic and radio compass indicators.

Heretofore, it has been the practice in the art of navigation indicating systems of this general character to use two or more separate instruments, one being either a magnetic compass or a directional gyro and the other a radio compass comprising a pointer operated from a radio direction finder system superimposed over an azimuth dial adjustable from the exterior of the instrument. To obtain readings of relative or true bearing it was incumbent on the pilot or navigator to read the compass or directional gyro and manually set the azimuth dial of the second instrument in correspondence therewith.

In order to circumvent the use of two or more instruments where readings had to be correlated manually, it has been further suggested to use a combined magnetic and radio compass instrument whereby heading and relative bearing information was available on one instrument. These latter systems, although constituting a distinct advance in the art, bore certain disadvantages in that they were complex in structure, required mechanical cables from the radio direction finder to the radio pointer with consequent back-lash problems and, moreover, the use of a composite magnetic and radio compass indicator to effect straight line navigation necessitated either opening the instrument to set a desired track index relative to a compass dial or else required setting of the azimuth dial relative to the track index so that subsequent correlation with a compass or gyro was needed.

By the novel system of the present invention all of the foregoing disadvantages have been eliminated and a new and novel navigation indicating system provided thereby wherein true heading and relative bearing together with a wealth of other important navigation information is readily available on one composite instrument adapting the latter as a basic navigational aid.

An object of the present invention, therefore, is to provide an improved and novel navigation indicating system comprising a single composite instrument adapted to serve as a basic navigational aid.

Another object of the present invention is to provide a novel all electric system comprising a combined magnetic and radio compass indicating instrument.

A further object of the invention is to provide a novel instrument of the character described which comprises a compass dial angularly movable from a compass system and cooperating with a fixed reference or lubber line, a second dial bearing a fixed reference which normally moves in unison with the compass dial but is relatively movable with respect thereto by means accessible from the exterior of the instrument, and a radio compass needle superimposed for relative motion with respect to both dials.

Another object is to provide an all electric multi-purpose navigational instrument.

Another and further object is to provide a novel and simple instrument of the character described whereby straight line navigation, track angle navigation, homing navigation, great circle navigation, blind landings, etc., may be effected with the use thereof and which, moreover, serves as an indicator of numerous navigational data such as, for example, drifting, drift angle, track angle, true bearing, reciprocal bearing, magnetic bearing, heading, steering, measured turn, and wind direction and wind angle.

The above and further objects and novel features of the invention will more fully appear from the following detailed description when the same is read in connection with the accompanying drawings. It is to be expressly understood, however, that the drawings are for purposes of illustration only and are not intended as a definition of the limits of the invention.

In the drawings wherein like reference characters refer to like parts, throughout the several views, Figure 1 is a front elevation view of the novel composite magnetic and radio compass indicator of the present invention;

Figure 2 is a cross-section view taken substantially along lines 2—2 of Figure 1;

Figure 3:
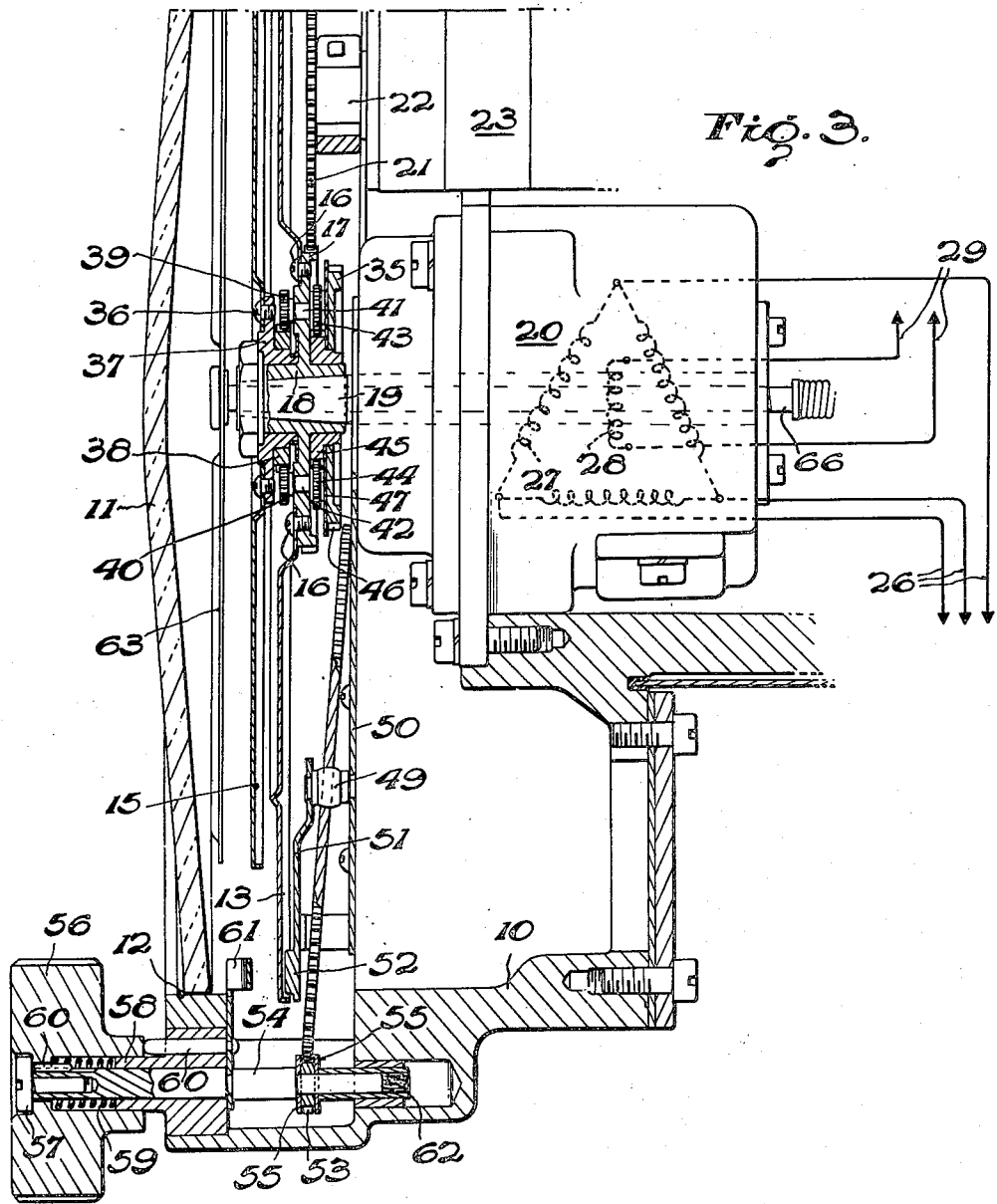
Figure 3 is an enlarged view of a portion of the structure of Figure 2.

Referring now to the drawings for a more detailed description, and more particularly to Figures 1 and 2 thereof, the present invention is shown as comprising a navigational instrument having a casing 10 whose open front end is closed by a transparent cover glass 11 retained in place by means of a split retaining ring 12. Visible from the front of the instrument is an outer disc or compass dial 13 adapted for cooperation with a fixed rubber line 14 carried by the casing and a mask disc or inner dial 15, both dials being normally movable in unison about a common axis as will presently appear.

As shown more clearly in Figure 3, compass dial 13 is fastened by means of screws 16 to a driven gear 17 which has secured thereto or formed integrally therewith a hub 18 through which gear 17 is fixed to a shaft 19 of an inductive device 20, the shaft being hollow for a purpose to be described hereinafter. A driving gear 21 which meshes with gear 17 is carried by a shaft 22 which, in turn, through a reduction gearing (not shown) within casing 23 (Figure 2) is operated by a two phase induction motor 24. Inductive device 20 and motor 24 constitute the torque amplifier portion of an earth induction compass system of the general type fully described and claimed in U. S. Patent No. 2,240,680 issued May 6, 1941.

The inductor element, generally represented in Figure 2 with the reference character 25 and which may be of the general type disclosed in the aforementioned patent, develops upon relative motion with the earth's magnetic field three signals or E. M. F.'s which are communicated by way of conductors 26 to a three phase wound stator 27 (Figure 3) of device 20. Variation in the stator winding signals provides an angularly movable resultant magnetic field at rotor winding 28 which is secured for angular motion with shaft 19 so that a signal is induced in the rotor winding proportional to the amount of relative movement of the inductor element with the earth's magnetic field. The signal induced in winding 28 is few by way of leads 29 to the input of a conventional vacuum tube amplifier 30 and out therefrom by way of leads 31 to energize the variable phase of motor 24, the second phase thereof being connected to a suitable source of current (not shown) by way of leads 32. Energization of the variable motor phase causes the motor to drive gear 21 through the reduction gearing as well as compass dial 13 and shaft 19, such operation continuing until rotor winding 28 is moved to a position where its electrical axis is normal to the resultant field of the stator whereupon the signal drops to zero to de-energize the variable motor phase. Simultaneously, dial 13 has been moved relative to lubber line 14 an angular amount proportional to the amount of relative movement of the inductor element with the earth's field so that a reading against the lubber line provides a direct reading of craft heading. To this end, dial 13 is provided with suitable graduations 33 arranged concentrically thereon from 0° to 360°.

Inner dial 15 is provided, as shown in Figure 1, with two sets of graduations 34 arranged in a novel manner, one set reading to the left from 0° to 180° and the other set reading to the right from 0° to 180°, together with two spaced parallel markers or grid lines 35 etched or otherwise suitably fastened to dial 15. The graduations of dial 15 moreover, are so arranged as to be immediately adjacent and directly readable on the graduations of compass dial 13. The dial itself is fastened by way of screws 36 to a flanged sleeve 37 which is freely mounted on hub 18, the sleeve supporting a gear 38 thereon which meshes with two small pinions 39 and 40 carried by shafts 41 and 42 journalled in gear 17. The opposite ends of these shafts support pinions 43 and 44 thereon which mesh at diametrically opposite points with a gear 45 loosely sleeved on hub 18 and which, moreover, has fastened thereto a relatively large gear 46. The latter gear is provided with a friction surface 47 which normally engages similar friction surfaces on pinions 43 and 44 so that upon movement of gear 17, gear 46 is moved therewith and, the system being locked, causes dials 13 and 15 to move in unison.

When it is desired to steer a given heading, inner dial 15 may be adjusted relative to compass dial 13 so that the 0° mark of the inner dial will be opposite the desired heading value on the compass dial, and such an adjustment is effected, as more fully described and claimed in copending application Serial No. 561,216, filed October 31, 1944, and which issued as Patent No. 2,506,885 on May 9, 1950, by means of a relatively large gear 48 which is mounted for rotation as well as limited lateral motion on a ball type or swivel shaft 49 which is journalled at one end in a plate 50 and at its other end in a stationary bracket 51, the bracket bearing at its free end a shoe 52 arranged closely adjacent the outer periphery of compass dial 13. The lower end of gear 48 is at all times in mesh with a pinion 53 fastened to a shaft 54 between two bearing members 55 which are also fixed to the shaft. An actuating knob 56 is secured to the free end of shaft 54 by a screw 57, and is accessible from the front of the instrument.

The actuating knob is sleeved on a hollow hub 58 which is pressed into casing 10 and a coil spring 59 is sleeved about shaft 54 and abuts hub 58 and the interior of the knob so that once the knob is pushed inwardly and subsequently released, the coil spring will return it to the position shown in Figure 3. The knob supporting hub 58 is provided with an aperture for the reception of a pin 60 which abuts the knob at one end and at its opposite end supports a spring clamp 61, the lower end of which is split to straddle shaft 54 so that the clamp will move inwardly with pin 60 and schaft 54 but the shaft may be rotated relative thereto.

Inward motion of knob 56 urges shaft 54 to the right into a suitable aperture 62 formed in casing 10, and the shaft by so moving also moves pinion 53 whereby the top end of gear 48 is moved to the left into mesh with gear 46 while both shaft 54 and pin 60 move clamp 61 to engage and urge compass dial 13 against shoe 52. Rotation of knob 56 produces rotation of gear 48 whereupon gear 46 rotates therewith to rotate pinions 43 and 44 as well as pinions 39 and 40. Gear 17 being fixed, pinions 39 and 40 drive gear 38 whereby mask or inner dial 15 is moved angularly relative to the compass dial to any desired position. When knob 56 is released, spring 59 drives the knob to the left, the latter carrying shaft 54 as well as clamp 61 and pinion 53 therewith, so that the clamp releases dial 13 while gear 48 is moved to the right out of mesh with gear 46. With subsequent motion of the outer dial, the inner dial moves in unison therewith because of the frictional engagement heretofore described.

Figure 4:
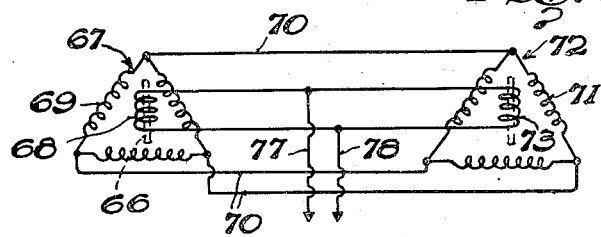
Figure 4 is a wiring diagram of the electrical connection between the radio direction finder and the radio needle.

Radio compass needle or pointer 63 is superimposed for angular motion relation to dials 13 and 15 and is provided with a head portion 64 and a tail portion 65, both portions being arranged to be read directly against either or both sets of graduations of the dials. Pointer 63, moreover, is carried by a shaft 66 which is received by hollow shaft 19 of device 20 and passes therethrough to an inductive device 67 to support therein a rotor winding 68 (Figure 4) which is inductively coupled with a three phase wound stator 69. The stator, in turn, is connected by suitable leads 70 to a three phase wound stator 71 of an inductive device 72, having an inductively coupled wound rotor 73, arranged between the directional antenna 74 and the radio receiver 75 of a radio direction finder system.

The direction finder system per se is well known in the art and as such constitutes no part of the present invention. It consists generally of the radio receiver 75, directional antenna 74 and a non-directional antenna 76. As is well known in the use of such systems, the directional antenna is initially arranged to be normal to the nose of the craft and during craft flight is driven toward a null position relative to radio waves emanating from a preselected radio station, i. e., a position normal to the radiating waves. The radio direction repeating system is so arranged that the electrical nulls of the transmitter and receiver inductive devices coincide with the zero angle of bearing with respect to the longitudinal axis of the craft. Motion of the directional antenna angularly displaces wound rotor 73 relative to stator 71 of inductive device 72 so that signals are developed in the stator and communicated to stator windings 69 by way of leads 70. Since rotors 68 and 73 are connected in parallel with a suitable source of alternating current (not shown) by way of leads 77 and 78, the magnetic field of rotor 68 coacts with the magnetic field of stator 69 so that rotor 68 is displaced angularly until its electrical axis becomes normal to the resultant of the field of stator 69. Such angular motion is transferred by shaft 66 to pointer 63 so that the latter will point in the direction of the transmitting radio station. Stator connecting leads 70 and the rotor leads may all be confined in a suitable cable 79.

The following consideration of the numerous navigational data, taken more or less in the order of their importance, available from the novel instrument hereinabove described because of the arrangement of its dials and pointer and especially in view of the inner dial and its novel manner of calibration will clearly demonstrate the importance thereof as a novel basic navigational aid.

*Drifting indicator.*—The coordinated use of the radio direction pointer 63 and parallel markers 35 on dial 15 will indicate whether or not a predetermined course with respect to the ground is being maintained, i. e., whether or not the craft is drifting, and if it is drifting, in which direction. This is an important navigational aid. The 0° mark of inner dial 15 is set by means of knob 56 opposite the desired course value on compass dial 13 and parallel markers 35 of the inner dial, being parallel to the 0°–180° line, delineate the track. If radio pointer 63 lies between and parallel to markers 35 the craft is "on-course" and is not drifting. If pointer 63 diverges from the parallel position, drifting is indicated. If, for example, the radio station is ahead of the craft and pointer 63 moves to the right of the 0° mark of dial 15 it indicates to the pilot or navigator that the radio station is to the right and that drifting to the left of the station is taking place. Conversely, if the pointer moves to the left of the 0° mark of dial 15 it indicates that the radio station is to the left and that drifting to the right is taking place. It is of importance to note, however, that the amount of divergence of the pointer from the 0 mark of dial 15 is no indication of the vector quantity of drift, when a radio station ahead of the craft is used for navigational reference, since the angle of divergence will vary with the distance from the station under equal conditions of drift.

*Straight line navigation.*—The novel instrument of the present invention makes it possible to effect straight track navigation towards or away from a radio station despite cross-winds and/or non-visibility, simply by using the instrument to maintain a zero-drifting condition. In actual flight this condition is determined experimentally by finding a "crab-angle" heading which keeps radio pointer 63 confined centrally between parallel markers 35 of dial 15. For example, if the radio station is ahead of the craft and pointer 63 diverges to the left of the 0° mark of dial 15, drifting to the right is indicated. By a subsequent series of gradual increments of craft heading changes into the wind the proper "crab-angle" is found and read on dial 15 at lubber line 14. The determination of the proper "crab-angle" is manifested by the fact that the angle of divergence between pointer 63 and parallel markers 35 remains constant. At this point the craft will be slightly off-course since the drifting action is sensed only after it has taken place. In order to regain position over the desired track it is necessary to steer a heading into the wind in excess of the "crab-angle." If this is done, the divergence between radio pointer 63 and markers 35 gradually decreases, until parallel alignment is reached, when the excess angle is eliminated and the craft is maintained over the straight line to the preselected destination by flying the "crab-angle" previously determined.

*Drift angle indicator.*—Whenever a no-drifting condition has been achieved and is evidenced by the fact that the angle of divergence between radio pointer 63 and parallel markers 35 remains constant, the angle indicated on inner dial 15 at lubber line 14 is the drift correction angle. The drift correction angle is under such a condition numerically equal to the drift error angle but opposite in sense. As is known, drift angle information can be used in conjunction with other navigational information such as wind angle or ground speed, for example, to solve for wind velocity (direction and speed).

*Track angle indicator.*—It is known that the track a craft makes or its direction of travel with respect to the ground is a function of its heading and drift angle. Right drift is added to and left drift is subtracted from the heading to obtain the track. A visual indication of the track, as provided by the novel instrument of the present invention, is of considerable advantage in many navigation problems. The value of the drift angle may be obtained from a standard instrument such as a driftmeter, for example, and the 0° mark of inner dial 15 is then displaced by means of knob 56 with respect to lubber line 14, to the right if the drift angle is to the right and to the left if the drift angle is to the left, the number of degrees equal to the value of the drift angle, using the scales on inner dial 15 to measure the displacement. The numerical value of the track is shown on outer dial 13 opposite the 0° mark on dial 15, and the parallel markers 35 on dial 15 delineate the track visually.

*Track angle navigation.*—The novel instrument of the present invention, moreover, makes possible a new technique in plotting bearings for determining a fix. Bearings may be read with respect to inner dial 15 as relative to the track and plotted on the chart with respect to the track line which is normally already drawn on the chart. The protractor 0°–180° line is placed over the track line and the bearing drawn as a short line near the D. R. position. This line is then paralleled through the station and extended as far as necessary. The procedure is simple, rapid and avoids the necessity for making corrections for convergence of meridians or difference in variation between the radio station and that existing at the craft. If the craft is on-course (illustrated by parallel alignment of radio pointer 63 and markers 35) a single bearing on an off-course station and plotted as discussed above is sufficient for obtaining a fix and is a more rapid manner of obtaining fix than any heretofore known. The use of bearings relative to the track also makes possible the use of the "bow and beam bearings," "doubling the angle of the bow" and other methods used in surface navigation for obtaining fixes. Such bearings must necessarily be with respect to geographic patterns, and have not been used much in air navigation because the procedure for converting relative bearings to bearings with respect to the track was too cumbersome but such difficulty has been eliminated with the present instrument.

*True bearing indicator.*—The double ended pointer 63 repeats remotely the indications of an automatic radio direction finder or visual type Pelorus. These indications represent the bearing of the radio station or surface object with respect to the fore and aft line (lubber line 14) of the craft. Before such bearings can be plotted on a chart they must be evaluated as true bearings with respect to the geopgraphic meridian. This evaluation is performed automatically in the present instrument by reading the value of outer or compass dial 13 opposite the portion 64 of pointer 63. In this manner the known procedure of combining true heading and relative bearing arithmetically to obtain the true bearing is eliminated entirely so as to sped up the process of obtaining a fix by radio or sight bearings. Yawing of the craft during the bearing reading interval will not affect the accuracy thereof since under such a condition no relative motion between compass dial 13 and radio pointer 63 will be produced.

*Reciprocal bearing indicator.*—While it is possible to plot true bearings directly on a chart, using known techniques, the general procedure is to plot the reciprocals of the observed bearings from the radio station or the surface object. Reciprocal bearings in terms of true values may be read directly on the instrument of the present invention on the compass dial 13 opposite the tail portion 65 of radio pointer 63.

*Magnetic bearing indicator.*—Various techniques have been developed for use in conjunction with the radio direction finding charts in which magnetic instead of true bearings are plotted. To obtain direct readings of magnetic bearing it is only necessary to set the variation adjustment of the earth inductor compass system to zero so that compass dial 13 will indicate magnetic heading relative to lubber line 14 and the head portion 64 of radio pointer 63 will show magnetic bearings. Reciprocal magnetic bearings shown at the tail portion 65 of the pointer can be plotted directly through the corresponding value on the compass rose oriented around the station on which the bearing was taken. The use of magnetic bearings on range stations are also particularly helpful in the various range orientation procedures.

*Heading indicator.*—Compass dial 13 having calibrations 33 from 0° to 360° is read directly at lubber line 14 for heading value. The dial type indicator shown has certain desirable advantages over the pointer type of indicator moving over a fixed scale. Orientation with respect to geographic North and other points of the compass is visual and direct which is of considerable aid to the navigator and pilot. Moreover, since heading indications are obtained only at one point of the instrument, i. e., the lubber line 14, a magnifying glass may be used if desired to obtain closer readings.

*Steering indicator.*—Inner dial 15, calibrated from 0° to 180° to the left and right, normally moves with the outer dial 13 because of the friction driving engagement heretofore described, but may be adjusted by way of knob 56 with respect to dial 13. To steer a heading, therefore, inner dial 15 is adjusted by knob 56 so that its 0° mark is set opposite the desired heading value on compass dial 13. The craft is thereafter turned to maintain the 0° mark of dial 15 opposite lubber line 14. Parallel markers 35 on dial 15 help maintain this attitude, while the amount of yaw in degrees will always be indicated directly on inner dial 15 opposite the lubber line. This feature is definitely of assistance towards better steering inasmuch as no instrument has been heretofore provided which gives the navigator a direct indication of the amount of turn in either direction.

*Measured turn indicator.*—Measured turns in either direction can be facilitated by the use of inner dial 15 of the present instrument. For example, let it be assumed that it is desired to make a turn of 60° to the left. The new heading is indicated directly on compass dial 13 opposite the 60° mark to the left of 0° on inner dial 15. The dial 15 is thereafter adjusted by knob 56 so that its 0° mark is opposite the new heading read on dial 13 and a craft turn is made until the 0° mark of inner dial 15 is opposite the lubber line 14.

*Homing navigation.*—The craft may be navigated along a "homing" path simply by keeping the head portion 64 of radio pointer 63 on lubber line 14. In doing so the craft is always pointed towards the radio station and will eventually reach it regardless of wind drift conditions. This procedure has the advantage of extreme simplicity besides the fact that the destination is reached headed directly into the wind which is helpful for landing purposes. Under wind drift conditions the path over the ground will be curved and the time consumed in reaching the desired destination will be somewhat longer than that of the straight line method.

*Great circle navigation.*—Radio signals follow the great circle path over the earth's surface. Straight line navigation over extended routes as hereinabove described will avoid the necessity for approximating the great circle route by a series of rhum-line courses determined by computation and will also obviate the difficulties encountered in the use of great circle planning charts.

*With direction and wind angle indication.*—If the parallel markers 35 on inner dial 15 are visually aligned with the direction of the wind (by wind streaks, smoke, etc.), the angular value of the direction of wind is indicated on compass dial 13 opposite the 0° mark of dial 15. The wind angle between the heading and the wind is shown on inner dial 15 at lubber line 14, and the wind angle between the track and the wind is shown on the inner dial opposite the wind direction on the dial 13 when the 0° mark of inner dial 15 is set opposite the track value on outer dial 13.

*Instrument or blind landings.*—The novel instrument of the present invention may be used for straight line navigation as heretofore described as a runway localizer for blind approach procedures.

Although but one embodiment of the invention has been illustrated and described in detail, it is to be expressly understood that the invention is not limited thereto. Various changes can be made without departing from the spirit and scope of the invention as the same will now be apparent to those skilled in the art. For a definition of the limits of the invention, reference will be had primarily to the appended claims.

I claim:

1. A navigational indicating instrument comprising a casing, a lubber line fixed relative to said casing, a compass disc mounted in said casing and rotatable relative to said lubber line and having graduations in degrees readable against said lubber line, a track reference disc having an index and a scale in degrees at each side of said index readable directly against said lubber line and said graduations, said track reference disc normally rotating with said compass disc, and means to rotate said reference disc relative to said compass disc for adjustment.

2. A navigational indicating instrument comprising a casing with an opening therein, a lubber line fixed relative to said casing, a compass disc mounted in said casing and rotatable relative to said lubber line and having graduations in degrees arranged concentrically and visible through said opening and readable against said lubber line, a track reference disc mounted concentrically with said compass disc and having an index and a pair of scales from zero to 180 degrees positioned immediately adjacent to said graduations and readable through said opening and against said lubber line and said graduations, one of said scales reading to the left of said index and the other scale reading to the right of said index, said track reference disc normally rotating with said compass disc, and means exteriorly of said casing to rotate said track reference disc relative to said compass disc.

3. An aircraft navigational indicating instrument comprising a casing, a lubber line fixed relative to said casing, a compass disc mounted in said casing and rotatable relative to said lubber line and having graduations in degrees readable against said lubber line, a track reference disc having an index and a scale in degrees at each side of said index and readable against said lubber line and said graduations, a pair of parallel lines on said track reference disc at opposite sides of the axis of said disc and equally spaced therefrom, said track reference disc normally rotating with said compass disc, means to rotate said reference disc relative to said compass disc for adjustment, and a radio compass pointer rotatable relative to said discs and cooperating with said parallel lines, said scales and said graduations to indicate the course of the aircraft in which the instrument is mounted.

4. A navigational indicating instrument as described in claim 13 in which the compass and track reference discs and the radio compass pointer are coaxial and the radio compass pointer is of less width than the spacing of the parallel lines so that the parallel lines are readily visible when the pointer is aligned therebetween.

LOUIS A. WARNER.

REFERENCES CITED

The following references are of record in the file of this patent:

UNITED STATES PATENTS

| Number | Name | Date |
| --- | --- | --- |
| Re. 21,419 | Kollsman | Apr. 9, 1940 |
| 1,175,979 | O'Connor | Mar. 21, 1916 |
| 2,210,435 | Ruf | Aug. 6, 1940 |
| 2,240,680 | Stuart, Jr. | May 6, 1941 |
| 2,321,606 | Lear | June 15, 1943 |
| 2,323,337 | Lear | July 6, 1943 |
| 2,334,116 | Meredith | Nov. 9, 1943 |
| 2,359,691 | Tillander | Oct. 3, 1944 |
| 2,413,214 | Carlson | Dec. 24, 1946 |

FOREIGN PATENTS

| Number | Country | Date |
| --- | --- | --- |
| 305,438 | Germany | May 7, 1918 |
| 13,769 | France | Apr. 11, 1911 |
| | (Addition to No. 419,682) | |